(12) United States Patent
Staargaard et al.

(10) Patent No.: US 6,955,393 B2
(45) Date of Patent: Oct. 18, 2005

(54) FRONT END MODULE

(75) Inventors: James E. Staargaard, Farmington Hills, MI (US); Eric Kowal, Roseville, MI (US); Thomas M. Goral, Oakland Township, MI (US); Mitch Brown, Laingsburg, MI (US); Keith R. Panter, Ann Arbor, MI (US); Larry D. Butterfield, Canton, MI (US); Blair Longhouse, Otterville (CA); Jerry Klanges, Woodstock (CA); Terry E. Nardone, Waterford, MI (US); Dennis Gaida, Clarkston, MI (US)

(73) Assignees: General Electric Company, Southfield, MI (US); Carlisle Engineered Products, Inc., Livonia, MI (US); Vari-Form, Woodstock (CA)

(*) Notice: Subject to any disclaimer, the term of this patent is extended or adjusted under 35 U.S.C. 154(b) by 0 days.

(21) Appl. No.: 10/741,095

(22) Filed: Dec. 19, 2003

(65) Prior Publication Data
US 2004/0160088 A1 Aug. 19, 2004

Related U.S. Application Data
(60) Provisional application No. 60/434,923, filed on Dec. 19, 2002.

(51) Int. Cl.$^7$ .............................................. B60K 11/04
(52) U.S. Cl. ........................ 296/193.1; 296/193.09; 296/901.01; 180/68.4
(58) Field of Search ................... 296/193.09, 203.02, 296/193.01, 193.04, 193.1, 901.01; 180/68.4

(56) References Cited

U.S. PATENT DOCUMENTS

| | | | |
|---|---|---|---|
| 5,190,803 A | | 3/1993 | Goldbach et al. |
| 5,658,041 A | | 8/1997 | Girardot et al. |
| 6,189,958 B1 | * | 2/2001 | Guyomard et al. ........ 180/68.4 |
| 6,227,321 B1 | * | 5/2001 | Frascaroli et al. ......... 180/68.4 |
| 6,273,496 B1 | | 8/2001 | Guyomard et al. |
| 6,412,855 B1 | * | 7/2002 | Cantineau et al. ..... 296/187.01 |
| 6,464,289 B2 | * | 10/2002 | Sigonneau et al. .... 296/193.09 |
| 6,547,317 B1 | * | 4/2003 | Cheron et al. ......... 296/193.01 |
| 6,619,419 B1 | * | 9/2003 | Cheron et al. .............. 180/311 |
| 6,715,573 B2 | * | 4/2004 | Emori et al. ............... 180/68.4 |
| 6,729,424 B2 | * | 5/2004 | Joutaki et al. ............. 180/68.4 |
| 2001/0053431 A1 | | 12/2001 | Goldbach et al. |
| 2002/0060476 A1 | * | 5/2002 | Cantineau et al. .......... 296/194 |
| 2002/0084122 A1 | * | 7/2002 | Emori et al. ............... 180/68.4 |
| 2004/0046422 A1 | * | 3/2004 | Igura et al. ............ 296/193.09 |

* cited by examiner

Primary Examiner—Patricia L. Engle
(74) Attorney, Agent, or Firm—Wam Hoffmann Miller & LaLone PC

(57) ABSTRACT

A front end module including a plastic component connected to a metallic substrate. The metallic substrate can be formed by hydroforming and shaped into a substantially unitary member. The plastic component is then molded about the metallic substrate and simultaneously forms connections thereto at discrete locations along the length of the metallic substrate.

17 Claims, 2 Drawing Sheets

FRONT END MODULE

CROSS-REFERENCE TO RELATED APPLICATION

The instant application claims priority to U.S. Provisional Patent Application Ser. No. 60/434,923, filed Dec. 19, 2002, the entire specification of which is expressly incorporated herein by reference.

FIELD OF THE INVENTION

The present invention generally relates to components comprised of metallic and plastic content, and more particularly to front end modules including a plastic material connected to a metallic substrate.

BACKGROUND OF THE INVENTION

Currently, structural components for vehicles, such as vehicle front end modules and door supports are made of metal and/or plastic. Front end modules provide structure to the vehicle as well as providing attachment structure for various vehicle components, such as the headlamps, radiator, fan, horn, and the like. Preferably, the front end modules can be provided in a single unit assembly, which is ready to be mounted to the vehicle by the manufacturer.

Commonly, such structural components are made from several stampings that are welded together. Alternatively, such components have been made from closed section metal, such as by extrusion or hydroforming. The use of closed section metal provides a relatively stronger component. Typically, however, additional metal material must be welded to the closed section metal components to provide for attachment surfaces.

These structural components are not currently made entirely from plastic material for larger vehicles because of the inability to meet vehicle performance requirements. However, use of plastic components in conjunction with metal to provide attachment points for the vehicle components is known in the art. In some instances, the metal structural component is attached to the plastic component with mechanical fasteners, such as screws or rivets. But, the use of this method is relatively cost and labor intensive.

Another method of securing the plastic to the metal structure is shown in U.S. Pat. No. 6,273,496 to Guyomard et al. and assigned to Valeo Thermique Moteur. This reference appears to disclose a front panel that includes metal structural components, including a closed section metal component. A plastic material is overmolded over the metal structure.

Another method of securing plastic to metal is shown in U.S. Application Publication No. 2001/0053431 to Goldbach et al. in the name of Bayer Corporation. Another such plastic and metal part is shown in U.S. Pat. No. 5,190,803 to Goldbach and assigned to Bayer Akhengesellsschaft.

Accordingly, there exists a desire for front end modules that include a plastic component attached to a metallic substrate, especially wherein the plastic component can be connected to the metal substrate during fabrication without the use of mechanical fasteners while also using a relatively small amount of plastic material to achieve the connection.

SUMMARY OF THE INVENTION

In accordance with a first embodiment of the present invention, a front end module is provided, comprising a metallic component having at least one opening formed therein. The module further comprises a plastic component disposed about at least a portion of the metallic component, wherein a first portion of the plastic material extends through the at least one opening and a second portion of the plastic material extends about an external surface of the metallic component so as to connect the plastic component to the metallic component.

In accordance with another embodiment of the present invention, a front end module is provided, comprising a contoured unitary metallic component having at least one opening formed therein. The module further comprises a plastic component disposed about at least a portion of the metallic component, wherein a first portion of the plastic material extends through the at least one opening and a second portion of the plastic material extends about and envelopes an external surface of the metallic component so as to connect the plastic component to the metallic component.

In accordance with another embodiment of the present invention, a front end module is provided, comprising a contoured unitary metallic component having at least one opening formed therein, wherein the metallic component includes a horizontal portion and two spaced and opposed vertical portions extending therefrom. The module further comprises a plastic component disposed about at least a portion of the metallic component, wherein a first portion of the plastic material extends through the at least one opening and a second portion of the plastic material extends about and envelopes an external surface of the metallic component so as to connect the plastic component to the metallic component.

BRIEF DESCRIPTION OF THE DRAWINGS

A further understanding of the present invention will be had in view of the description of the detailed description of the preferred embodiments, when viewed in conjunction with the accompanying drawings wherein.

The same reference numerals refer to the same parts throughout the various Figures.

DETAILED DESCRIPTION OF THE PREFERRED EMBODIMENTS

The following description of the preferred embodiment(s) is merely exemplary in nature and is in no way intended to limit the invention, its application, or uses.

For example, although the following description primarily describes the present invention in connection with a front end module, it is to be appreciated that the present invention is likewise applicable to all applications wherein it is desired to connect a plastic component to a metallic component without the need for separate fasteners.

With reference to the Figures, a composite front end module in accordance with the general teachings of the present invention is generally shown at 10.

The front end module 10 is preferably comprised of a single (e.g., unitary) metallic member, such as, but not limited to, a tube generally indicated at 12 (which is preferably manufactured by hydroforming) that is preferably joined to a plastic component, such as but not limited to a panel generally indicated at 14.

Preferably, the tube 12 comprises a closed cross section. The use of such closed cross section metal components provides rigidity to the module 10. The closed form section can take any suitable configuration. It need not necessarily have a constant cross sectional shape. Such structures are particularly useful for vehicle support structures. It will be understood that open cross-section metal components may also be used within the scope of the present invention. The tube 12 may comprise any suitable metal, such as but not limited to steel, aluminum, and the like.

Figure 1:
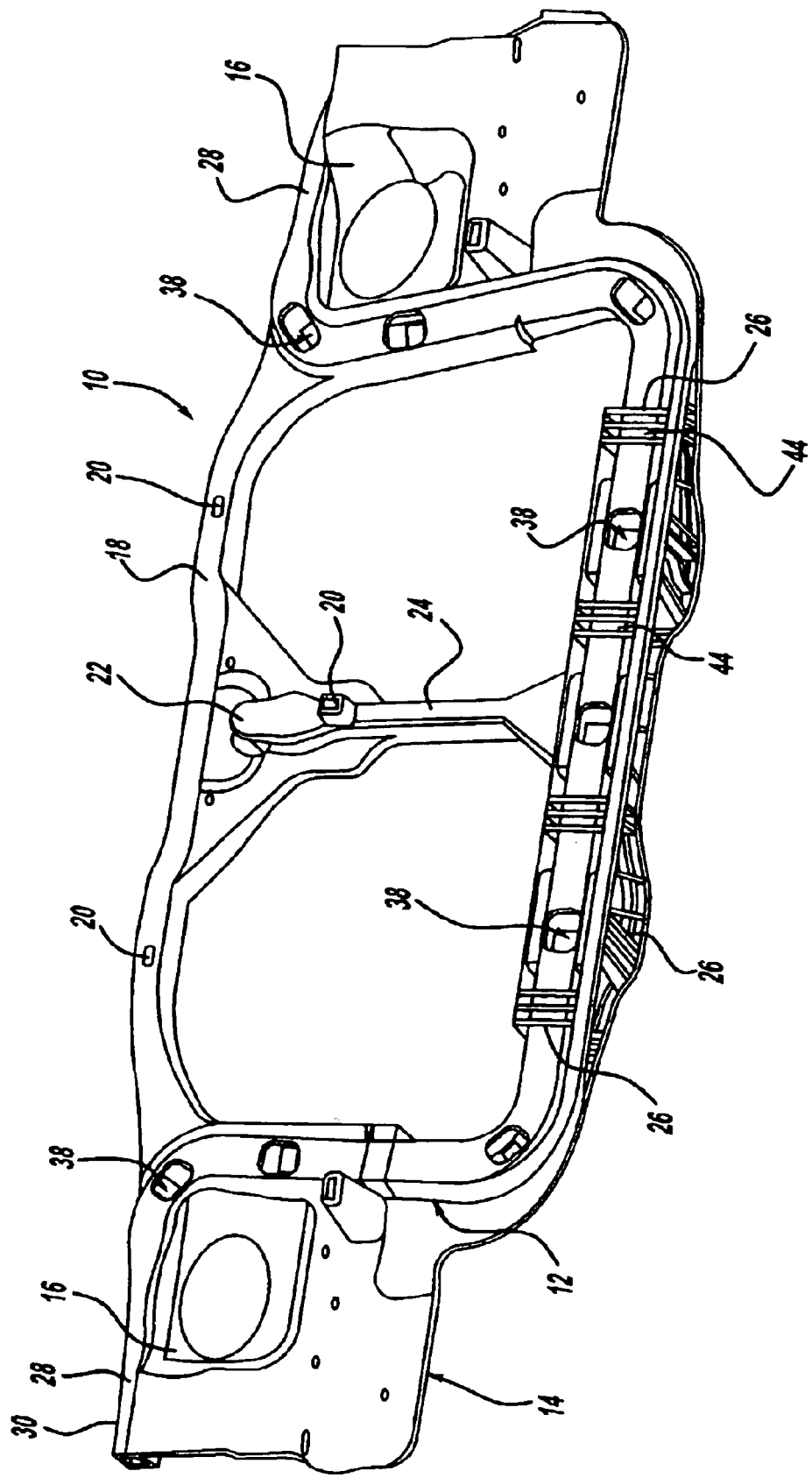
FIG. 1 is a front perspective view of a front end module, in accordance with the general teachings of the present invention.
Figure 2:
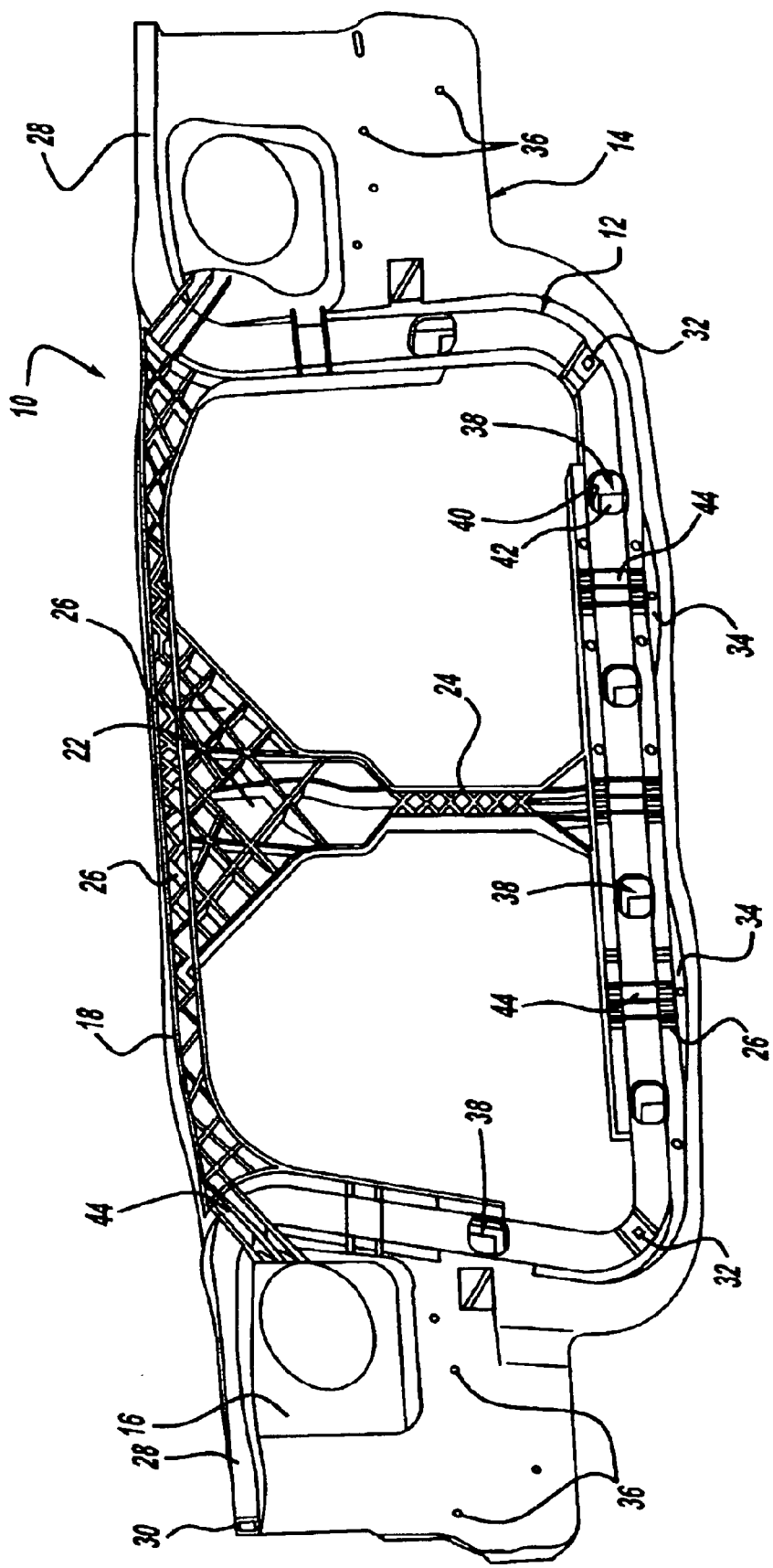
FIG. 2 is a rear perspective view of the front end module depicted in FIG. 1, in accordance with the general teachings of the present invention.

The tube 12 can be configured in any number of configurations. However, those configurations that are suitable for use in front end modules are preferred. By way of a non-limiting example, the tube 12 preferably begins at the upper area of the module and is adapted to be connected to a vehicle structure such as a fender (not shown). The tube 12 extends generally horizontally as shown over the area corresponding to the headlamp module area or mount 16. The tube 12 then turns and runs generally vertically down roughly parallel with the area corresponding to the location of the side of the radiator (not shown). The tube 12 then turns to run generally horizontally and parallel with the area corresponding to the location of the bottom of the radiator (not shown). The tube 12 then turns to run generally vertically and upward roughly parallel with the opposite side of the area corresponding to the location of the radiator (not shown). The tube 12 then turns to run generally horizontally and over the opposing headlamp module area or mount 16 and ends at the opposite fender (not shown). As shown in FIGS. 1 and 2, the tube 12 generally comprises a u-shaped member with extensions 28 extending outwardly from each arm of the u-shaped member. Again, it is preferred that the tube 12 be formed as a one-piece closed cross-section member such as by hydroforming.

The plastic panel 14 can be configured in a number of suitable configurations. However, those configurations that are suitable for use in front end modules are preferred. By way of a non-limiting example, the plastic panel 14 preferably comprises an upper cross member 18, headlamp mount 16, grill support 20, hood latch mount 22, vertical center support 24, and the like. The plastic panel 14 may also comprise at least one, and more preferably a plurality of reinforcement members, e.g., strengthening ribs 26. As shown, the plastic panel 14 is preferably contoured to allow for attachment of the aforementioned components, and the like, and also may be provided with additional surface effects, such as but not limited to openings, flanges, bosses, and other protuberances.

The plastic panel 14 is preferably made from any suitable thermoplastic or thermoset material. One such example of a plastic material may comprise modified polyphenolene oxide. While one example of a suitable plastic is provided, it will be appreciated that any suitable thermoplastic or thermoset may be used within the scope of the present invention. Further, fillers or other additives may be added to the plastic material to strengthen the plastic panel 14. Any suitable filler may be used. Such fillers may comprise, for example, glass fiber or plastic fiber.

The extensions 28 of the front end module 10 are preferably fixed to the upper front end of the fenders through the ends 30 of the extensions 28 of the tube 12. The ends 30 of the extensions 28 of the tube 12 can preferably include openings for receiving fasteners to secure the module 10 with the vehicle fenders. The lower portion of the tube 12 preferably joins to the vehicle chassis in two places through brackets (not shown) attached to the tube 12 at attached points 32.

The front end module 10 preferably locates the fenders and provides a structural load path from the fenders to the vehicle chassis. The front end module 10 also preferably locates and supports the loads created by the cooling module by way of integral mounting supports 34. The front end module is also adapted to support a variety of other components such as, but not limited to an air filter housing, A/C receiver dryer, headlamp module, coolant reservoir, fan shroud, and horn which can also preferably be mounted to the front end module 10. Mounting holes 36 can be provided to mount these components and the like.

Tube 12 is preferably manufactured by first forming and piercing a tube, preferably by hydroforming. The tube 12 is then placed in an injection molding tool. The mold is then closed, wherein plastic material, preferably including reinforcement, such as glass fibers, is pumped into the cavity of the injection molding tool thus forming the panel 14 into the desired configuration and simultaneously joining it to the tube 12 at discrete locations generally indicated at 38 leaving the remainder of the tube's 12 front and back surface exposed. More specifically, in order to join the tube 12 to the panel 14, an opening (not shown) is formed on one side of the tube 12. An opposite opening 40 is formed on the opposite side of the tool. A core tool is inserted through the opening 40 and adjacent the opening on the opposite side of the tube 12. The core tool provides a cavity that allows the plastic material to flow from one side of the tube 12 through the opening into the cavity of the core tool. In this manner, plastic flows through the opening, but does not fill the entire cavity of the tube 12.

Preferably, the plastic material forms a button-like structure 42 on the inside of the tube. This button-like structure 42 has edges that extend over the opening in the tube 12. The plastic material forms on the opposite side of the tube 12 from the opening 40 and may include strengthening ribs 26. With the connection in this manner, plastic is secured to the tube 12 without the need to fully fill the tube 12 with plastic material. Thus, the plastic material preferably infiltrates, at least partially, into the tube 12 at locations 38 and, after cooling, forms a connection point with the tube 12. A connection securing the plastic panel 14 with the tube 12 is shown at 38 and is fully described in U.S. Patent Application Ser. No. 60/398,901, by the same inventors hereto, and is incorporated herein by reference. It will be appreciated that the connections at the locations 38 can be configured in any number of forms, and can include, without limitation, depressions, openings, holes, apertures, bores, through bores, and the like.

Further, as shown, the plastic material can preferably be formed around the tube 12, as shown at 44. Strengthening ribs 26 may also be included as set forth above. With connection made in this manner, the plastic material preferably forms around the outer surface of the tube 12 and, after cooling, forms a connection point with the tube 12. Further, the connection made in this manner, by molding the plastic panel 14 to tube 12, the need for separate fasteners to connect the plastic components of the metal substrate is eliminated. It will be appreciated, however, that separate fasteners may be included in addition to the connection system set forth above.

While injection molding is the presently preferred method of making the module 10, it will be appreciated that any other suitable forming technique may be uses within the scope of the present invention. These include, without limitation, compression molding, injection compression molding, extrusion compress, gas assist or water assist pressure molding, low pressure molding, blow molding, thermoforming and/or rotational molding.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and appended claims.

What is claimed is:

1. A front end module, comprising:
   a continuous and unitary metallic component having at least one opening formed therein; and
   a plastic component disposed about at east a portion of the metallic component, wherein a first portion of the plastic material extends through the at least one opening and a second portion of the plastic material extends about an external surface of the metallic component so as to connect the plastic component to the metallic component;
   wherein the metallic component includes a horizontal portion and two spaced and opposed vertical portions extending therefrom.

2. The invention according to claim 1, wherein the metallic component is formed by hydroforming.

3. The invention according to claim 1, wherein the metallic component is a contoured unitary member.

4. The invention according to claim 1, wherein the metallic component comprises a closed cross section.

5. The invention according to claim 1, wherein the metallic component includes a plurality of openings formed therein.

6. The invention according to claim 1, wherein the plastic component includes at least one opening formed therein.

7. The invention according to claim 1, wherein the plastic component includes a plurality of openings formed therein.

8. The invention according to claim 1, wherein the plastic component includes at least one attachment hole formed therein.

9. The invention according to claim 1, wherein the plastic component includes at least one reinforcement member formed on a surface thereof.

10. A front end module, comprising:
    a contoured continuous and unitary metallic component having at least one opening formed therein, wherein the metallic component includes a horizontal portion and two spaced and opposed vertical portions extending therefrom; and
    a plastic component disposed about at least a portion of the metallic component, wherein a first portion of the plastic material extends through the at least one opening and a second portion of the plastic material extends about and envelopes an external surface of the metallic component so as to connect the plastic component to the metallic component.

11. The invention according to claim 10, wherein the metallic component is formed by hydroforming.

12. The invention according to claim 10, wherein the metallic component comprises a closed cross section.

13. The invention according to claim 10, wherein the metallic component includes a plurality of openings formed therein.

14. The invention according to claim 10, wherein the plastic component includes at least one opening formed therein.

15. The invention according to claim 10, wherein the plastic component includes a plurality of openings formed therein.

16. The invention according to claim 10, wherein the plastic component includes at least one attachment hole formed therein.

17. The invention according to claim 10, wherein the plastic component includes at least one reinforcement member formed on a surface thereof.

* * * * *